March 15, 1960  R. H. PETERSON  2,928,667
GRAVITATIONAL OR ACCELERATIONAL RESPONSIVE DEVICE
Filed Aug. 24, 1953  2 Sheets-Sheet 1

INVENTOR.
Robert H. Peterson
BY
ATTORNEY

March 15, 1960 R. H. PETERSON 2,928,667
GRAVITATIONAL OR ACCELERATIONAL RESPONSIVE DEVICE
Filed Aug. 24, 1953 2 Sheets-Sheet 2
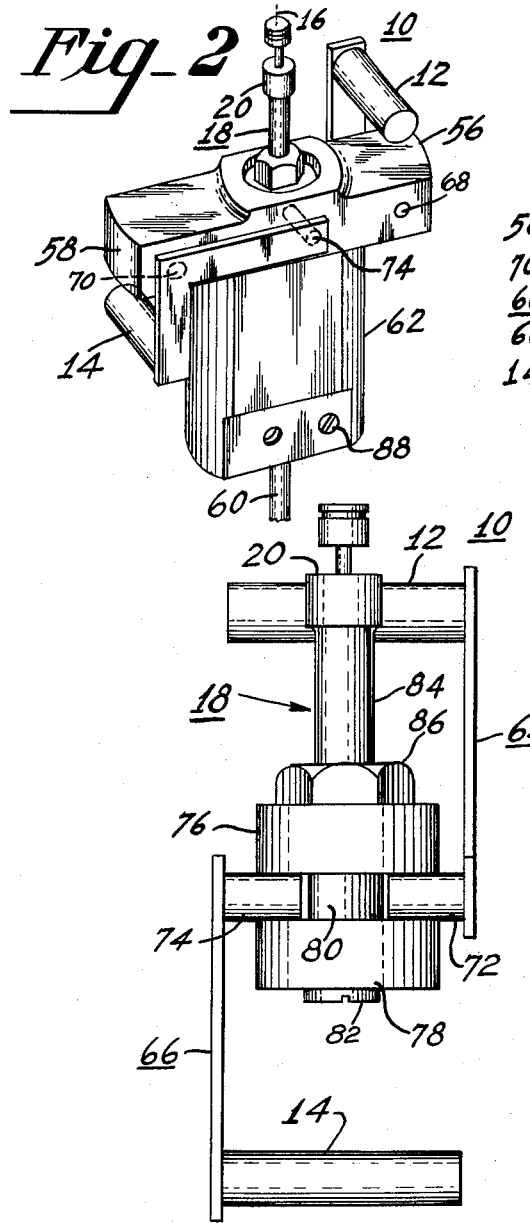
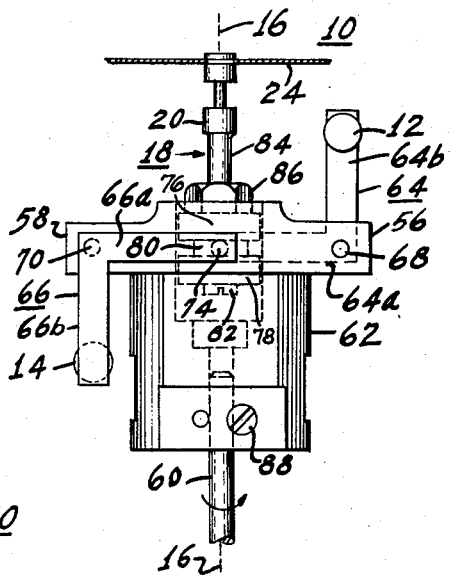
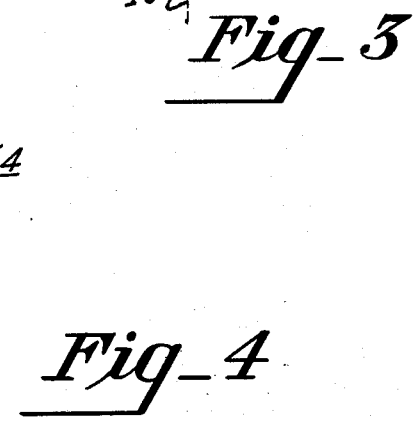
INVENTOR.
Robert H. Peterson
BY
ATTORNEY

United States Patent Office 2,928,667
Patented Mar. 15, 1960

2,928,667

GRAVITATIONAL OR ACCELERATIONAL RESPONSIVE DEVICE

Robert H. Peterson, Woodbury Heights, N.J., assignor to Radio Corporation of America, a corporation of Delaware Application August 24, 1953, Serial No. 375,987

15 Claims. (Cl. 264—1)

The present invention is related to a device or arrangement which may be used as an accelerometer or to detect the departure from a true vertical.

The problem of maintaining a stable platform frequently arises. For example, in the navigation of and fire control from air-craft and water-craft, a stable platform is desired. Also, an accelerometer, that is a device which responds to acceleration, is convenient in navigation. Such a device is described in the copending application of John R. Ford, Serial No. 288,081, filed May 15, 1952, for "Apparatus for Erecting a True Vertical Axis." The device disclosed in the present application may be considered an improvement on the device disclosed in the copending Ford application.

It is an object of the present invention to provide a novel device, useful for erecting and maintaining a true vertical axis, a stable platform, or as an accelerometer.

Another object of the invention is to provide such a device of increased sensitivity. A further object of the invention is to provide a novel means for maintaining a platform stable with respect to the vertical, which means are rugged, compact, and relatively accurate.

A further object of the invention is to provide a novel device of the character described which provides an electrical signal in response to accelerational or gravitational forces, the signal from which is improved in amplitude and quality, and in signal-to-noise ratio.

In accordance with the present invention, a mass is revolved about an axis. The mass is connected to an axially disposed element by a lever having a fulcrum center outside the axis in a plane normal to the axis and excluding the center of gravity of the mass. The element is held by a yielding means in a position of balance. Departure of the axis from the vertical or external acceleration of the device causes changes in the lever force on the element. A pendelum-like action results. The axially disposed element then has an oscillatory motion along the axis about its normal static position assumed when the axis is vertical. This oscillatory motion is translated, by suitable means, into an alternating voltage which has a phase and amplitude dependent respectively on the direction of the accelerative force (external or if gravitational, the direction of tilt of the axis) and on the amplitude of the accelerative force (external or if gravitational, the amplitude of tilt). This signal may be resolved into two components which respectively control the orientation of the axis about two mutually perpendicular axes normal to the axis of revolution, by known means.

According to further important features of the invention, a pair of masses are employed disposed on opposite sides of the axes. The fulcrum centers of the masses are disposed in the same plane normal to the axis, but one mass is above and the other below this plane. Also, the masses have their centers of gravity respectively in a straight line above and below the fulcrum centers when the axis of revolution is in its normal vertical position. The masses are mechanically coupled to the axially disposed element so that the centrifugal forces on the element tend to cancel, but forces due to gravitation or external acceleration tend to aid in the element displacement. As will appear more fully hereinafter, the disposition of the masses disclosed herein enhances sensitivity.

Another feature of the invention resides in rotation of a body carrying the masses about the axis in their revolution and to which the levers are pinned, but allowing the axially disposed element mechanically coupled to the masses as described to be held for axial displacement without rotation.

The foregoing and other objects, advantages and novel features of the invention will be more fully apparent from the following description when taken in connection with the accompanying drawing, in which like reference numerals refer to similar parts, and in which:

Fig. 2 is a perspective view of a device according to the invention;

Figs. 3 and 4 are side elevational views of the device of Fig. 2; and

Figure 1:
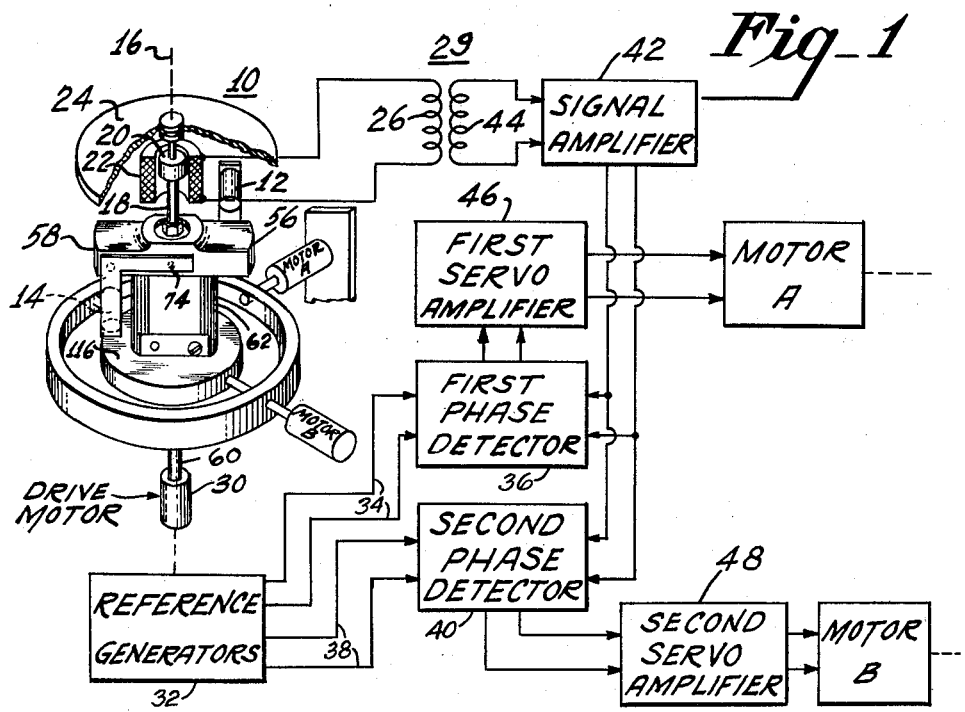
Fig. 1 is a diagram schematically portraying a system for maintaining an axis in the true vertical.

Referring to Figs. 1 and 3, the device 10 includes a pair of masses 12 and 14 revolved around a vertically disposed axis 16 and connected by levers 64 and 66 respectively to an axially disposed member 18. The levers 64 and 66 have their fulcrums at the centers of pivot pins 68 and 70 respectively. The masses 12 and 14 are mechanically connected to translate their joint motion into motion of the axially disposed element 18 up or down along the axis 16. At its upper end portion, the axially disposed element includes a pole piece 20 about which is wound a stationary coil 22. The element 18 is held at its upper end in a diaphragm 24 for limited vertical displacement with a restoring force to a normal position. The mass 12 is above, and the mass 14 is below, a plane normal to the axis 16 and median between the masses, and in which plane are the fulcrums of the levers for the respective masses 12 and 14. The centers of gravity of masses 12 and 14 are respectively in straight lines parallel to axis 16 and intersecting respectively the fulcrum axes at the respective centers of pivot pins 68 and 70. Consequently, when the mass 12 is urged outward radially the axially disposed element 18 is urged upwardly; similarly when the mass 14 is urged radially outward, the axially disposed element 18 is urged downward. The design is such, preferably, that the upward and downward forces on the axially disposed element 18 are in balance when the axis is vertical. This balance would be a condition of unstable equilibrium, except that the element 18 is under limited restraint of the diaphragm 24. The diaphragm 24 yieldingly holds the element 18 against displacement along the axis 16, substantially in its normal balanced condition. Therefore, the axially disposed element 18 remains static so long as the axis is vertical and no accelerative forces are impressed upon the device 10. In other words, due to the restorative force exerted by the diaphragm, the axially disposed element 18 is in a position of stable equilibrium for any contemplated speed of revolution of masses 12 and 14.

Let it be supposed that the device 10 becomes disposed so that the axis 16 is no longer truly vertical. Then a signal is developed due to the combined forces on the masses 12 and 14. Assume the centrifugal forces are substantially equal and opposite in their lever forces on the element 18. Revolution of each mass (12 or 14) about the tilted axis causes a change in the lever force on the element 18, because the direction of the gravitational force with respect to the fulcrum at the pivot center changes. Each mass acts similarly to a pendulum. These changes of the direction of gravitational forces on the two masses, 12 and 14, relative to the fulcrums causes changes in force on the axially disposed element 18 which aid each other. Thus the arrangement may be compared to two pendulums in aiding relationship which affords dynamic balance to the whole.

Disposition of the masses 12, 14 each respectively above and below its own fulcrum center of pivots 68 and 70 respectively when the axis 16 is vertical is especially advantageous. This disposition affords the greatest sensitivity for departure from the vertical. Even for external accelerational forces, sensitivity is increased, because incremental forces of the latter nature are aided by the gravitational forces. Further, the opposing centrifugal forces, once unbalanced by any of the forces to be detected, aid the unbalance. Thus the revolution of masses 12 and 14 tends to enhance sensitivity. Any slight or incremental condition of unbalance due to axis 16 tilt or to external acceleration is, so to speak, enlarged upon and increased. If, now, the restoring force, in this instance afforded by the diaphragm, is suitably selected, advantage is taken of the unstable equilibrium condition to afford a greatly increased sensitivity. The restoring force simply prevents the device from "running away" with itself. The dynamic balance achieved permits high rotational rates, which are desirable for reasons which, though apparent, are pointed out at least in part hereinafter.

As a result of the masses 12 and 14 revolving, and their pendulum action through the levers, the axially disposed element 18 oscillates about its normal position along the tilted axis 16 with the same rate as the rate of revolution. These movements of the axially disposed element and the pole piece 20 carried by it, cause the lines of magnetic force from the pole piece to intersect the coil 22. Accordingly, a pulsating signal is generated in the coil 22 which may be applied through slip rings or the like if necessary (not shown) to a primary 26 (Fig. 1) of a transformer 29. The details of the device 10 and its operation will be more fully described hereinafter, the foregoing description being sufficient, however, for the purposes of explanation of the circuit and operation of the arrangement of Figs. 1 and 3.

In the circuit of Fig. 1, the signal frequency of the signal applied to the primary 26 is the frequency of revolution of the masses 12, 14 as driven by a drive motor 30. The drive motor also drives a pair of reference generators 32 providing signals of the same frequency as the frequency applied to the transformer 29. The output of one of the reference generators 32 is applied by leads 34 to a first phase detector 36. The output of the other of the reference generators 32 is phased 90° with respect to the output of the signal on the leads 34, and is applied by leads 38 to a second phase detector 40. The signal derived from the secondary winding 44 of the transformer 29 is applied to the input circuit of a signal amplifier 42. The amplified signal from the device 10 is applied to the first and second phase detectors 36 and 40 respectively. The output of the first phase detector 36 is applied to a first servo amplifier 46 to control the shaft rotation of a first stationary mounted motor A. The output of the second phase detector 40 is applied to a second servo amplifier 48 which controls the shaft rotation of a second motor B. Motor A is mechanically connected to the platform 116 on which the device 10 is mounted and rotates the platform 116 in one direction or the other about a nominally horizontal axis preferably intersecting substantially at right angles the axis 16. The second motor B is arranged to rotate the platform 116 on which the device 10 is mounted about an axis normal to the axis 16 and normal also to the normally horizontal axis of rotation for motor A. Different manners of mounting platform 116 for rotation about the horizontal axes are known.

Any of many known phase detectors may be employed for the detectors 36, 40. An example of reference generators 32 and commutating type phase detectors 36 and 40 suitable for employment in the arrangement of Fig. 1 are those employed in the antenna positioning circuit of the U.S. Army SCR–584 radar (radio echo detection and ranging) system, described in Theory of Servomechanisms, vol. 25, MIT Radiation Laboratory Series, pp. 212 et seq. The reference voltage on connection 34 may be adjusted to provide an error signal to which the first servo motor A is responsive. The reference voltage on connection 38 then provides an error signal from the second phase detector 40 to which the motor B is responsive. The output of the phase detectors is used as an error voltage and has sensing. In the SCR–584 circuit the servo amplifiers 46 and 48 take the form of a D.-C. (direct current) amplifier including an amplidyne. The motor A is a D.-C. motor receiving the current output of the amplidyne. Anti-hunt and other auxiliary circuits may be provided as desired or as necessary. As this type of resolving circuit is well known, no further description thereof is deemed necessary. In fact, it will be apparent to those skilled in the art that other suitable phase detector, amplifier, and motor arrangements than the one here specifically indicated may be employed. The choice of components may well depend on the frequencies involved, the load to be positioned, and other factors of mere design. For example, the first motor A may be a two-phase motor. For purposes of illustration herein, it should, therefore, be understood that the connections shown, especially to the motors A and B, are merely schematic, and well understood by those skilled in the servo or electrical motor arts.

With the reference generators in suitable adjustment, it may be shown that the motor A is not responsive to departures of the axis 16 from the vertical so long as the axis 16 remains in the plane which includes the vertical and the axis about which the first motor A drives the platform 116. Similarly, the motor B is not responsive to departures of the axis 16 from the vertical so long as the axis 16 remains in the vertical plane which includes the axis about which the motor B drives the platform 116 of the device 10. As the axes about which the first and second motors A and B drive the platform are normal to each other, it is apparent that corrections of the axis 16 may always be resolved into two rotations, one of which is about the axis of drive of motor A, and the other which is about the axis of drive of motor B. The connections between the coil 22, transformer 29, and the associated circuits and motors A and B are in such sense that the motors drive in a direction to restore the axis 16 into the vertical plane. This part of the system is readily understood by those skilled in the art from the similar part of the system disclosed in said Ford application, or in the SCR–584 radar.

Accordingly, the axis 16 of revolution is maintained in the true vertical. If the rate of rotation of the drive motor 30 is slow, then the rate of correction by which the axis 16 is restored to the vertical will similarly be slow. On the other hand, if the rate of rotation of the drive motor 30 is too great, then the inertia of the elements is important, and the displacement of the axially disposed element is either too small to develop a signal, or the changes are too rapid for the masses involved to follow, so that the displacement along the axis 16 of the axially disposed element is negligible. Therefore, while the rate of rotation of device 10 should be high, a value near optimum should be selected, taking into consideration the mass of the parts and their mechanical ruggedness.

The details of the device 10 are more fully illustrated in Figs. 2, 3, and 4. The device may be, for example, 5 or 6 inches long and weigh only a pound or two, and be very compact. The shaft of the drive of the motor 30 (Fig. 1) may be connected to or a part of the shaft 60 to which a body 62 (Fig. 2) of the device 10 is attached to be rotatably driven. As shown in Fig. 3, the body 62 may have a pair of like aligned arms 56 and 58 disposed on opposite sides of the axis 16 of the device 10. A pair of levers 64 and 66 are mounted on pins 68 and 70 respectively which are journaled into the arms 64 and 66 respectively near their ends. The centers of the pins serve as the fulcrums of the levers 64 and 66. Each lever 64 or 66 takes the form of a first bar, 64a or 66a respectively, lying substantially along the common plane which includes the centers or axes of pins 68 and 70 and which is normal to the axis of rotation 16, and a second bar, 64b or 66b respectively, at right angles to the first bar and normal to this common plane and thus substantially parallel to the axis 16. At the ends of the second arms 64b and 66b respectively are mounted the masses 12 and 14. The levers 64 and 66 are disposed on opposite sides of a vertical plane through the axis 16 which passes through the centers of the masses 12 and 14. The arrangement is as symmetrical as possible with respect to the axis 16 to give improved dynamic balance. At the ends of the substantially horizontal bars 64a and 66a remote from the pins 68 and 70, the levers 64 and 66 are pinned or pegged, as by pegs 72 and 74 respectively (Fig. 4), aligned on opposite sides of axis 16 of rotation and in the plane of the centers of pins 68 and 70, between a pair of ball bearing races 76 and 78 (Fig. 4) of the axially disposed element 18. As shown in Fig. 4, the races 76 and 78 are held in spaced position on the element 18 by a spacer 80 of sufficient width to afford room for the pegs 72 and 74. A bolt 82 is threaded into an elongated shaft portion 84 of the axially disposed element 18. A nut 86 threaded on to the shaft 84 affords an adjustable stop for the assembled races 76 and 78 and pegs 72 and 74.

The drive motor 30 of Fig. 1 is set on a frame (not shown), to which frame the diaphragm 24 (Fig. 3) is attached, by suitably positioning the shaft 60 and the body 62, by a set screw 88. By adjusting the nut 86 and the bolt 82 which fits into the shaft 84 threaded to receive it, the two races 76 and 78 are held at an appropriate position in a bore centrally drilled in the body 62 to receive the races, with the pegs 72 and 74 (Fig. 4) inserted in their proper positions. The shaft 84 also carries the permanent magnet head or pole piece 20. The coil 22 is not shown in Figs. 2, 3, or 4, but it is disposed on the frame (not shown) mounted on platform 116 (Fig. 1) to closely surround the pole piece 20, and may be solenoidal in form with its axis aligned with axis 16. The arrangement of the pole piece 20 and the diaphragm 24 and the coil 22 is similar to that of a permanent magnet loud speaker.

Referring now to Figs. 3 and 4, as the shaft 60 is rotated, the body 62 and the arms 56 and 58 are also rotated about the axis 16. Centrifugal force urges the masses 12 and 14 outwardly. However, because of the manner in which the masses 12, 14 are levered to the pegs 72 and 74, the peg 72 urges the axially disposed element 18 upward, and the peg 74 urges the axially disposed element 18 downward in response to the centrifugal force exerted by masses 12, 14. It is readily apparent that the balance achieved between the upward and downward forces without further restraint corresponds to a condition of unstable equilibrium, because if the mass 12, for example, begins to prevail in its exertion of force and is thrown slightly outward to move the element 18 up, the mass 14 is thus drawn inward. The centrifugal force exerted by the mass 12 now increases, whereas that exerted by the mass 14 decreases. Accordingly, the element 12 tends to seek its outermost position and the element 14 its innermost position. If, however, the mass 14 exerts a greater centrifugal force from the position of equilibrium, then the mass 14 seeks its outermost position and the mass 12 is forced into its innermost position. The undesired results of the unstable equilibrium are avoided, yet the sensitivity due to it largely retained, by the use of the diaphragm 24 to which the axially disposed element 18 is yieldingly connected to cause a condition of stable equilibrium to be achieved. If the axis 16 now remains in the true vertical, a condition of stable equilibrium prevails, in which the axially disposed element 18 does not move up or down. However, if the resilience of the diaphragm 24 is suitably selected, a high sensitivity is achieved. The ball bearings in the races 76, 78 help to maintain the axis of rotation of the body 62 in true alignment with that of the axially disposed element 18. Since the body 18 has no vertical displacement relative to the frame, the pole piece 20 being substantially symmetrically positioned with respect to the coil 22 (Fig. 1), no voltage is applied to the primary winding 26 of the transformer 29.

As each mass revolves with the axis 16 when it is tilted from the vertical, the moment of the mass due to gravity about its lever fulcrum changes. For example, when mass 12 is in its lowest position, the moment about the center of pin 68 tends to rotate mass 12 away from the axis 16. When mass 12 is at its highest position, this moment is changed and tends to rotate mass 12 toward the axis 16. With reference to tending to rotate the mass toward or away from the axis 16, the sense of the moment has changed as the mass position changes from lowest to highest. Thus each mass acts in response to a gravitational or accelerational force as a pendulum, and the two masses coupled together act as a pair of pendulums coupled together. In rotation about an untilted axis not subject to external force, the masses are restrained to a position of balance or equilibrium.

The rotation of the paired masses and their dynamically balanced geometry provides a system which may be made highly responsive to the accelerative forces to be detected, by suitable choice of speed of rotation and stiffness of diaphragm. The balance may be made sufficiently delicate that "sticking" is substantially eliminated. Moreover, the rotation affords a ready means for securing a single error signal which has error information with sensing for correction of rotation of the axis 16 about each of two mutually perpendicular axes in a horizontal plane. Thus a single device gives an error signal which may be resolved, in a manner to be described, to control the two independent motions for erection of axis 16 into the true vertical.

Although the apparatus described is directed to correcting for departure of the axis 16 from the vertical and the device is responsive to gravitational force, the device will respond to other accelerating forces external thereto. The masses act as coupled pendulums in response to such forces. Further, with a suitable restraining force on the axially disposed element and a single mass, the pendulum-like response described above results in response to gravitational or other external accelerational forces. Also, the masses 12, 14 are disposed so that with axis 16 vertical they are respectively in a line above and below the fulcrums of their respective levers 64, 66. This is a preferred position, affording the greatest increment of response for departure of axis 16 from the vertical or for external acceleration. In its upward motion, the lines of force from the pole piece 20 carried by the element 18 cut the turns of the coil 22 (Fig. 1) to produce a signal in one sense in the primary 26 of the transformer 29. When the pole piece 20 is in downward motion, a half revolution of the body 62 later, the signal is in the opposite sense. A half revolution of the body 62 later, conditions are reversed again. With each reversal a signal of opposite sign or sense is generated in the coil 22 and applied to the primary 26. The resultant alternating signal has a periodicity equal to the period of rotation of the shaft 60 as driven by the drive motor 30. This may be employed as the error signal, as fully explained in Fig. 1, for erection of the axis 16 into a true vertical plane. The fact that pole piece 20 is always maintained centered on the axis of its cooperating coil 22 avoids spurious responses, as the only signal desired is that in response to axial displacement of the pole piece 20.

Figure 5:
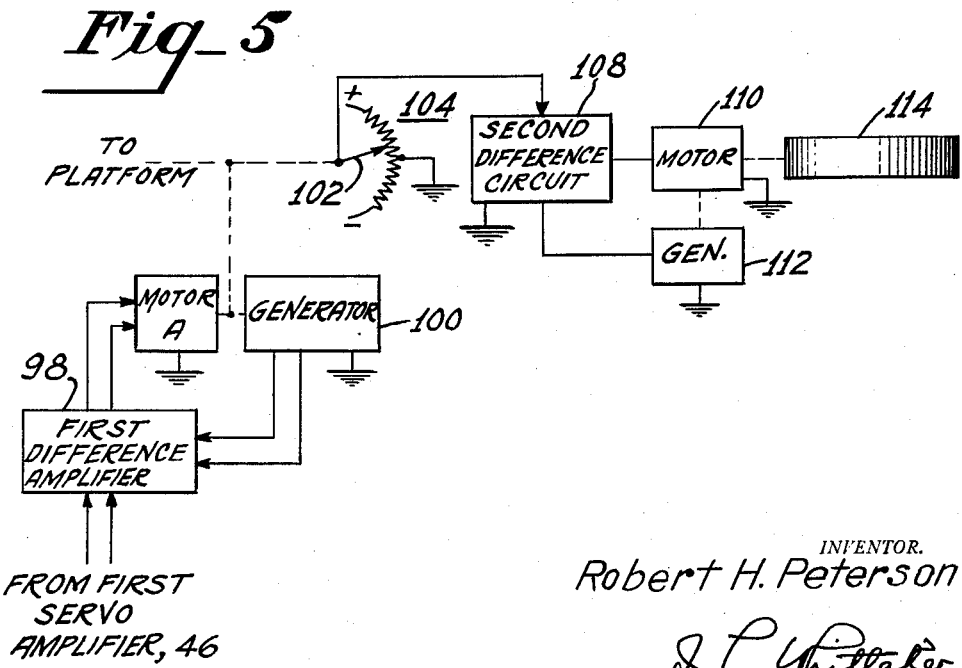
Fig. 5 is a diagram schematically illustrating a navigational system employing the accelerometer of Figs. 2–4.

Fig. 5 shows a modification of the invention wherein the signals as derived in Fig. 1 may be utilized so that the device 10 comprises an accelerometer. The signal from the first servo amplifier 46 is appled to a first difference circuit 98. The first servo motor A drives a generator 100, the output frequency of which is the same as the servo amplier signal frequency. The generator signal is applied to a difference circuit 98. The output of the difference circuit 98 is the difference between the signals from the first servo amplifier 46 and the generator 100, sense being taken into consideration. The first motor A also drives the arm 102 of a potentiometer 104, the resistor of which is grounded (as conventionally indicated) at an intermediate point, and which has positive and negative voltages respectively applied to its end terminals. The potentiometer arm 102 is connected to a second difference circuit 108 which, in turn, controls a second motor 110 driving a second generator 112, the output of which is applied to the second difference circuit 108. The second motor 110 also drives a counter or indicator 114.

In operation, the circuit of Fig. 5 includes two successive integrating circuits. The first integrating circuit comprises the difference circuit 98, the motor A, the generator 100, and the potentiometer arm 102. Since the servo loop comprising the difference circuit 98, the motor A, and the generator 100 is a speed servo, the speed of rotation of the shaft of the motor A, and consequently of the potentiometer arm 102, is substantially proportional to the input from the first servo amplifier 46. Accordingly, the position of the arm 102 of the potentiometer 104 must correspond to the integral of the input voltage. The initial position of the arm 102 corresponds to the constant of integration. Similarly, it is plain that a servo loop comprising the second difference circuit 108, the second motor 110, and the second generator 112 is a speed servo, and that a second integration takes place.

Assuming that the axis 16 of the device 10 of Figs. 1 to 4 remains in the true vertical, if a vessel or the like on which the device 10 is mounted is accelerated, due to the inertia of the masses 12 and 14 each will tend to oppose the accelerative force. Accordingly, supposing that the forces exerted in a predetermined plane along a predetermined line in a plane normal to the vertical, that is a predetermined horizontal plane, and that the arms 56, 58 instantaneously lie substantially along this line, then a moment is developed about the fulcrums (the centers of pins 68 and 70) which is different from the normally existing moments when there is no acceleration. Specifically, if the mass 12 is on the side of the axis for which the entire device 10 is being accelerated, then the peg 72 tends to force the element 18 downward to a greater degree than normal, and similarly the peg 74 tends to force the element 18 downward to a greater degree than normal, so that the axially disposed element 18 is displaced downwardly from its normal position. A half revolution of the body 62 later, when the mass 14 is on the side of the axis 16 toward which the device 10 is being accelerated, the axially disposed element 18 is displaced upwardly from its normal position. Thus an electrical signal is developed which is dependent on and proportional to the acceleration, and the respective phases of which, with respect to the signals from the reference generators, depends upon the direction of the acceleration. By the modification indicated in Fig. 5, this acceleration is integrated once to give a velocity indication, if desired, as by the position of arm 102 or its voltage; and a second time to give a distance direction as on the indicator 114, both resolved along one axis. A similar modification including a double integration of the output from the second servo amplifier 48 of Fig. 1 may provide velocity and distance indication along the second axis normal to the first on another distance indicator (not shown).

In order that the indications be useful for navigation on a ship or the like, it is desirable that the horizontal axes be always oriented along fixed directions, so that, for example, one such axis is always oriented in the north and south direction and the other in the east-west direction. This may be assured by known means, as by a gyroscopic compass.

An important economy of parts may be achieved by using the arrangement of Fig. 5 and the arrangement of Fig. 1 simultaneously. The first motor A is simply connected mechanically to the platform 116 as in Fig. 1, as indicated by legend in Fig. 5, and so also is the second motor B. Departures of the axis 16 from the true vertical which are corrected by operation of the servo motors A and B will substantially zero out in the final integration. The constants of integration are provided by the original setting of the potentiometer arm 102 and the indicator 114. If desired, however, the axis 16 may be maintained in the true vertical by an entirely separate and different system, as by a gyroscopic system.

Thus the invention provides a novel device useful as an accelerometer or as a vertical axis erecting device. The device comprises a pair of masses rotated about an axis on opposite sides of a plane normal to the axis of rotation and levered to exert forces on an axially disposed element, so that the centrifugal force of one mass tends to displace the said element upward and the centrifugal force of the other mass tends to displace the element downward. Variations in the vertical disposition of the axis, or accelerative forces, upset the condition of equilibrium so that the element is displaced up and down at a frequency corresponding to the frequency of rotation of the masses. An electrical signal corresponding to such displacement is derived which signal is employed to erect the axis into the true vertical or as accelerometer signals, or both.

What is claimed is:

1. In an accelerometer, a universally mounted body which is capable of spinning about a vertical axis which passes through the body; an element movably mounted in the body which spins with the body; drive means coupled to the body for spinning the same about said vertical axis; and means responsive to a departure of the spin axis of said body from the vertical for moving said element in the direction of the spin axis.

2. In an accelerometer, a universally mounted body which is capable of spinning about a vertical axis which passes through the body; an element movably mounted in the body which spins with the body; drive means coupled to the body for spinning the same about said vertical axis; and means pivotally mounted at one point to the body and coupled at another point to said movable element for moving the element in the direction of the spin axis of said body in response to a departure of said spin axis from said vertical axis.

3. A stable vertical system comprising, in combination, a universally mounted support; a body rotatably mounted on the support which is capable of spinning about a vertical axis which passes through the body and the support; an element movably mounted in the body which spins with the body; drive means fixed to the support and coupled to the body for spinning the same about said vertical axis; means coupled to the body and to the element and responsive to a departure of the spin axis of said body from said vertical axis for moving said element in the direction of said spin axis; means coupled to said element for translating said axial movement thereof to an electrical signal; and means responsive to said electrical signal for maintaining said support in a stable attitude such that said spin axis is vertical.

4. In an accelerometer, a universally mounted platform; a body which is rotatably mounted to the platform and is free to spin about a vertical axis which passes through the body; a shaft movably mounted in the body and which spins with the body, said shaft being aligned with said axis when the body spins about said axis; a motor fixed to the platform and coupled to the body for spinning the body about said axis; a pair of L-shaped lever arms, each coupled at one end to the shaft and pivotally coupled at the right angle portion thereof to the body, said lever arms extending on opposite sides of the body with the free end of one L extending up and of the other L extending down when the body spins about said vertical axis, the portion of the L between the shaft and the pivotal connection being horizontal when said body spins about said vertical axis; and a weight at the free end of each L.

5. In an accelerometer, a universally mounted support; a body which is rotatably mounted to the support and is free to spin about a vertical axis which passes through the body; an element movably mounted in the body which spins with the body; drive means fixed to the support and coupled to the body for spinning the body about said vertical axis; and a pair of L-shaped lever arms, each with a weight at one end, each coupled at the other end to said element, and each pivotally connected at its right angle portion to the body, said arms lying on opposite sides of the body with the portions thereof between the pivotal connections and said element horizontal when the body spins about a vertical axis and with one weight directly above a pivotal connection and the other weight directly below a pivotal connection when the body spins about said vertical axis, whereby a departure of the spin axis of the body from the vertical produces movement of said element in the direction of said spin axis.

6. In an accelerometer, a universally mounted platform; a body which is rotatably mounted to the platform and is free to spin about a vertical axis which passes through the body; a shaft movably mounted in the body and which spins with the body, said shaft being aligned with said axis when the body spins about said axis; drive means fixed to the platform and coupled to the body for spinning the body about said axis; and a pair of lever arms extending from opposite sides of the body, each with a weight at one end, said arms being pivotally connected at an intermediate portion thereof to the body, and at the other end thereof to said shaft in such manner that when the body spins about said vertical axis the centrifugal force on the weights causes one lever arm to tend to move the shaft axially in one direction and the other lever arm to tend to move the shaft axially an equal amount in the opposite direction, and when the spin axis departs from the vertical, gravity acting on the weights causes the lever arms to move the shaft axially.

7. In an acceleration sensing device, a pair of lever arms which extend in opposite directions from a spinning body which normally spins about a vertical axis and which is free to depart from the vertical spin axis in response to acceleration; means pivotally coupling said arms to outer portions of the body at intermediate points on the arms; a common movable element coupled to the portions of the arms extending from the pivotal connection of each arm toward the center portion of said body; and a weight on the portion of each arm beyond the pivotal connection of the arm to the body, said weights being arranged to produce equal and opposite forces on the movable element in response to centrifugal force on the weights when the body spins around a vertical axis, and to produce additive forces on the movable element due to the action of gravity on the weights when the spin axis departs from the vertical axis.

8. In an acceleration sensing means, a body mounted for universal movement; a shaft movably mounted in the body and free to spin with the body about the shaft axis; a pair of L-shaped arms extending in opposite directions from the body, each coupled at one end to the shaft and pivotally connected to the body at the right angle portion of the L, the portion of each L between the pivot and shaft lying in a horizontal plane when the body and shaft spin about a vertical axis, and the remainder of each L extending vertically under the same conditions; a weight at the other end of each L, one above and one below said horizontal plane when the spin axis is vertical; and means for spinning the shaft and body about the shaft axis, whereby when the spin axis is vertical, gravity does not affect the axial position of the shaft and when said spin axis is not vertical, gravity tends to rotate one L clockwise about its pivotal connection and the other L counter-clockwise about its pivotal connection and the shaft moves axially.

9. In an accelerometer, a universally mounted support; a body which is rotatably mounted to the support and is free to spin about a vertical axis which passes through the body; an element movably mounted to the body which spins with the body; drive means fixed to the support and coupled to the body for spinning the body about said axis; and a pair of lever arms, each with a weight at one end, said arms being pivotally connected at intermediate portions thereof to the body and at the other ends thereof to said element, said arms extending in generally opposite directions from the body with one weight directly above a pivotal connection and the other directly below a pivotal connection when the body is spun about said vertical axis, whereby when the spin axis is vertical, centrifugal force on the weights produces opposite forces on the movable element, and when the spin axis departs from the vertical, the force of gravity on the weights produces additive forces on the movable element and causes the latter to move in the direction of said spin axis.

10. In an accelerometer, a universally mounted support; a body which is rotatably mounted to the support and is free to spin about a vertical axis which passes through the body; an element movably mounted to the body which spins with the body; drive means fixed to the support and coupled to the body for spinning the body about said axis; a pair of lever arms, each with a weight at one end, said arms being pivotally connected at intermediate portions thereof to the body and at the other ends thereof to said element, said arms extending in generally opposite directions from the body with one weight directly above a pivotal connection and the other directly below a pivotal connection when the body is spun about said vertical axis, whereby when the spin axis is vertical, centrifugal force on the weights produces opposite forces on the movable element, and when the spin axis departs from the vertical, the force of gravity on the weights produces additive forces on the movable element and causes the latter to move in the direction of said spin axis; and resilient means fixed to the support and coupling to said element for limiting the extent of movement of said element in the direction of the spin axis.

11. In an accelerometer as set forth in claim 10, said resilient means comprising a resilient metal diaphragm fixed to said support and coupled at the center portion thereof to said movable element, said movable element being rotatably mounted in its coupling to said diaphragm.

12. A stable vertical system comprising a universally mounted support; a body which is rotatably mounted to the support and is free to spin about a vertical axis which passes through the body; an element movably mounted to the body which spins with the body; drive means fixed to the support and coupled to the body for spinning the body about said axis; a pair of lever arms, each with a weight at one end, said arms being pivotally connected at intermediate portions thereof to the body and at the other ends thereof to said element, said arms extending in generally opposite directions from the body with one weight directly above a pivotal connection and the other directly below a pivotal connection when the body is spun about said vertical axis, whereby when the spin axis is vertical, centrifugal force on the weights produces opposite forces on the movable element, and when the spin axis departs from the vertical, the force of gravity on the weights produces additive forces on the movable element and causes the latter to move in the direction of said spin axis; means operatively associated with said element for converting the movement thereof in the direction of the spin axis to an electrical signal; and means responsive to said signal for maintaining said support in an attitude such that the spin axis is vertical.

13. A stable vertical system comprising a universally mounted support; a body which is rotatably mounted to the support and is free to spin about a vertical axis which passes through the body; an element movably mounted to the body which spins with the body; drive means fixed to the support and coupled to the body for spinning the body about said axis; a pair of lever arms, each with a weight at one end, said arms being pivotally connected at intermediate portions thereof to the body and at the other ends thereof to said element, said arms extending in generally opposite directions from the body with one weight directly above a pivotal connection and the other directly below a pivotal connection when the body is spun about said vertical axis, whereby when the spin axis is vertical, centrifugal force on the weights produces opposite forces on the movable element, and when the spin axis departs from the vertical, the force of gravity on the weights produces additive forces on the movable element and causes the latter to move in the direction of said spin axis; means operatively associated with said element for converting the movement thereof in the direction of the spin axis to an alternating electrical signal at the spin frequency of said body; means for deriving from said drive means a second electrical signal at the same frequency and having a reference phase; means for deriving from the difference in phase between said two signals an error voltage; drive means for rotating said support around one axis; and means for applying said error voltage to said last-named drive means.

14. A stable vertical system comprising, in combination, a universally mounted support; a body rotatably mounted on the support which is capable of spinning about a vertical axis which passes through the body and the support; an element movably mounted in the body which spins with the body; drive means fixed to the support and coupled to the body for spinning the same about said vertical axis; means coupled to the body and to the element and responsive to a departure of the spin axis of said body from said vertical axis for moving said element in the direction of said spin axis; magnet means coupled to said element; a pick-up coil fixed to said support and located adjacent to said magnet means for translating the movement of said element in the direction of said spin axis to an electrical signal; and means responsive to said electrical signal for maintaining said support in a stable attitude such that said spin axis is vertical.

15. A stable vertical system comprising a universally mounted support; a body which is rotatably mounted to the support and is free to spin about a vertical axis which passes through the body; an element movably mounted to the body which spins with the body; drive means fixed to the support and coupled to the body for spinning the body about said axis; a pair of lever arms, each with a weight at one end, said arms being pivotally connected at intermediate portions thereof to the body and at the other ends thereof to said element, said arms extending in generally opposite directions from the body with one weight directly above a pivotal connection and the other directly below a pivotal connection when the body is spun about said vertical axis, whereby when the spin axis is vertical, centrifugal force on the weights produces opposite forces on the movable element, and when the spin axis departs from the vertical, the force of gravity on the weights produces additive forces on the movable element and causes the latter to move in the direction of the spin axis; means operatively associated with said element for converting the movement thereof in the direction of the spin axis to an electrical signal indicative of a component of acceleration; means for doubly integrating said signal to produce a resultant signal indicative of distance; and means responsive to the first-named electrical signal for maintaining said support in an attitude such that the spin axis is vertical.

References Cited in the file of this patent

UNITED STATES PATENTS

| | | |
|---|---|---|
| 742,874 | Junggren | Nov. 3, 1903 |
| 1,975,442 | Allen | Oct. 2, 1934 |
| 2,349,758 | Raspet | May 23, 1944 |
| 2,357,381 | Carlson | Sept. 5, 1944 |
| 2,376,844 | Ziebolz | May 22, 1945 |
| 2,379,289 | Farmer | June 26, 1945 |
| 2,412,211 | Eichelman | Dec. 10, 1946 |
| 2,420,984 | Shepard | May 20, 1947 |
| 2,554,512 | Varian | May 29, 1951 |
| 2,570,672 | Hathaway | Oct. 9, 1951 |
| 2,605,093 | Dorand | July 29, 1952 |
| 2,638,556 | Hausz | May 12, 1953 |
| 2,648,055 | Smith | Aug. 4, 1953 |
| 2,666,199 | Rothschild | Jan. 12, 1954 |
| 2,702,867 | Wightman | Feb. 22, 1955 |
| 2,704,815 | Guiles | Mar. 22, 1955 |
| 2,716,893 | Birdsall | Sept. 6, 1955 |

FOREIGN PATENTS

| | | |
|---|---|---|
| 3353/31 | Australia | Aug. 4, 1932 |